INVENTOR.
RUDOLPH A GOEPFRICH
BY
*G. A. Gust*
ATTORNEY

Nov. 22, 1955  R. A. GOEPFRICH  2,724,461
BRAKES

Filed Oct. 25, 1950  4 Sheets-Sheet 2

INVENTOR.
RUDOLPH A. GOEPFRICH
BY
G. A. Gust
ATTORNEY

Nov. 22, 1955  R. A. GOEPFRICH  2,724,461
BRAKES
Filed Oct. 25, 1950  4 Sheets-Sheet 3
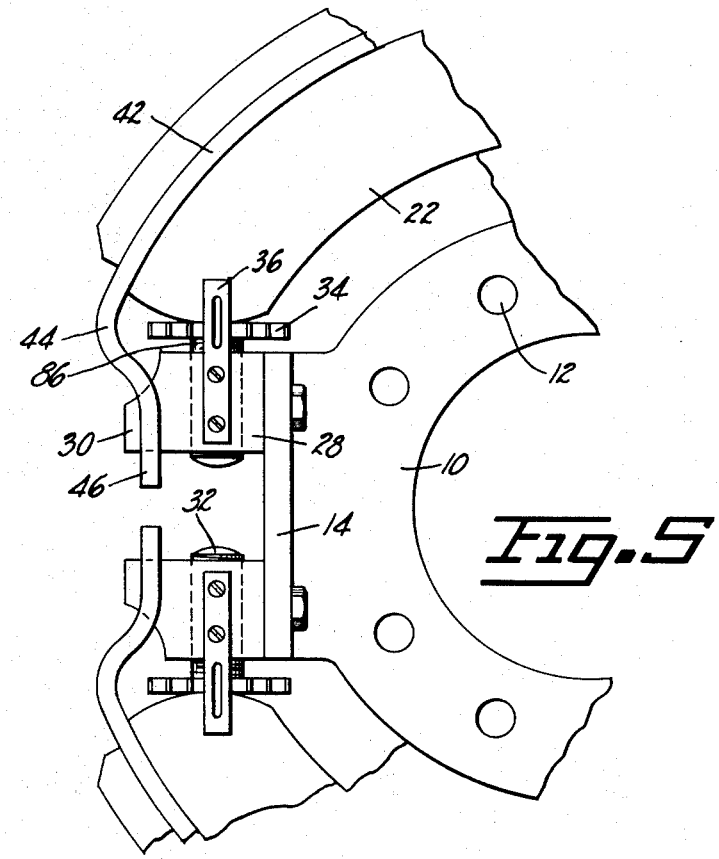
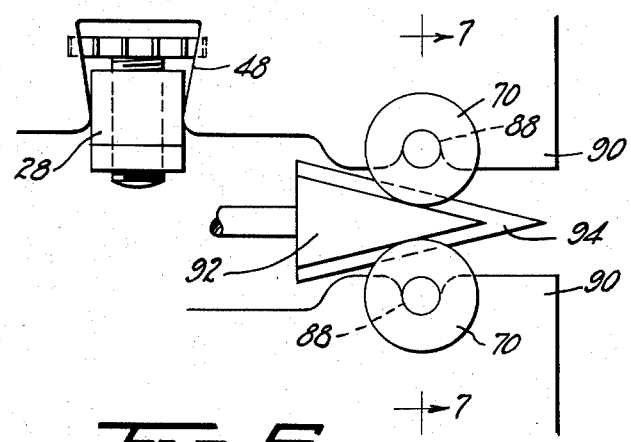
INVENTOR.
RUDOLPH A. GOEPFRICH
BY
G. A. Gust
ATTORNEY Nov. 22, 1955 R. A. GOEPFRICH 2,724,461
BRAKES
Filed Oct. 25, 1950 4 Sheets-Sheet 4

INVENTOR.
RUDOLPH A. GOEPFRICH
BY
G. A. Gust
ATTORNEY

United States Patent Office 2,724,461
Patented Nov. 22, 1955

2,724,461

BRAKES

Rudolph A. Goepfrich, South Bend, Ind., assignor to Bendix Aviation Corporation, South Bend, Ind., a corporation of Delaware Application October 25, 1950, Serial No. 192,067

10 Claims. (Cl. 188—78)

The present invention relates to internally expanding, shoe type brakes, and more particularly to a heavy duty brake having an actuator which acts at right angles to the direction of expansion of the shoes.

The primary object of the present invention is to provide a brake for use on relatively heavy vehicles, such as trucks and busses, and having design characteristics which make possible the incorporation of parts now produced in high production quantities. For example, the design practice generally followed in heavy duty brakes is to increase the size and strength of all parts over those used in light duty brakes; however, in the design made possible by this invention, wheel cylinders commonly used in light duty brakes, which are now high production items, are utilized as actuators for this heavy duty brake.

Another object of this invention is to provide a brake in which the shoes will maintain uniform engagement with the drum during the entire braking cycle even though the drum "bell-mouths." "Bell-mouthing" of a drum relates to the deformed shape of the drum caused by a moderately severe or severe brake application, the drum being distended to a cross-sectional shape of the frustum of a cone. When bell-mounthing occurs, the brake shoes tend to frictionally engage, with greater force, the smaller diameter drum surfaces. This leads to deleterious results, one of which is the uneven wearing of the brake shoe lining.

Another object of this invention is to provide a brake in which the shoe-rim ends are utilized to laterally position the shoes.

Still another object is to provide a brake utilizing at least one hydraulic actuator which acts in a line normal to the direction of movement of the brake shoes, as constrasted with the conventional hydraulic brake which has an actuator acting in substantially the same direction of movement as the brake shoes.

Other objects will become apparent as the description proceeds.

In the drawings:

Figure 5 is a fragmental side elevation of another embodiment illustrating that portion which differs from the embodiment of Figure 1;

Figure 6 is a fragmental end view of another embodiment showing the use of a different type of spreading mechanism.

Figure 1:
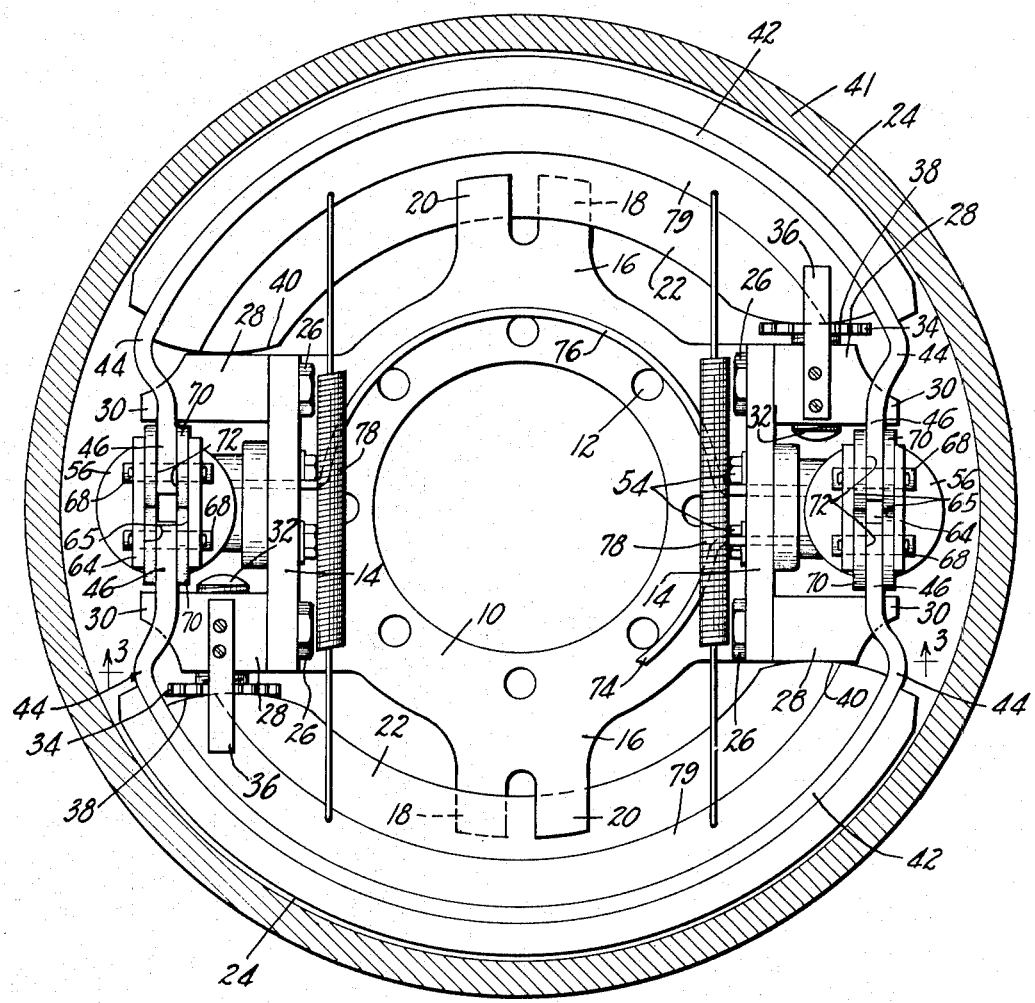
Figure 1 is a side elevation of an embodiment of the present invention.
Figure 2:
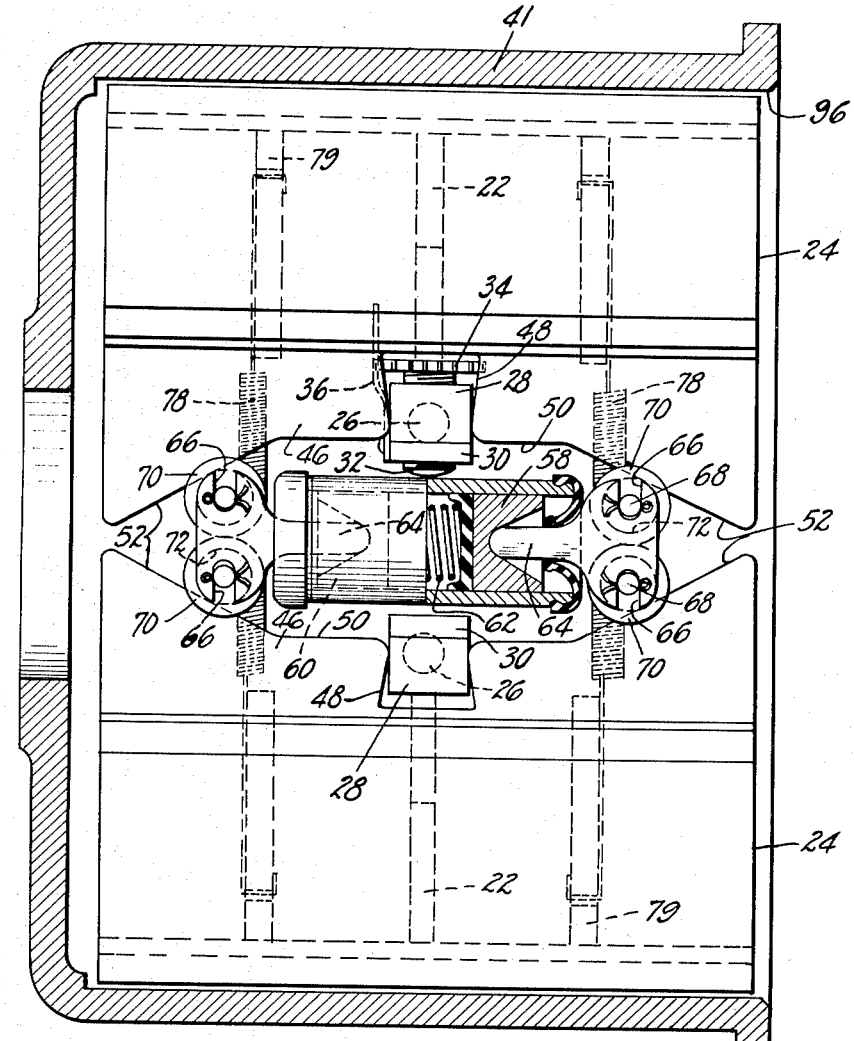
Figure 2 is a side view thereof showing the actuator in part section.
Figure 3:
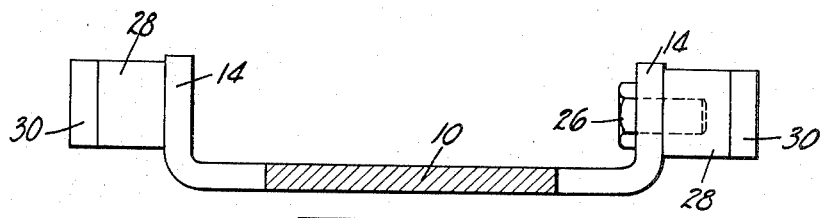
Figure 3 is a sectional view of the supporting member of Figure 1 taken substantially on section line 3—3 of Figure 1.

Referring to the drawings and more particularly to Figures 1–3, a support member, or spider 10, provided with circumferentially spaced mounting holes 12, carries as integral parts thereof, a pair of diametrically spaced, axially extending anchor flanges 14. Spider 10 also carries at an angle spaced 90° from the flanges 14, a pair of diametrically spaced ears 16 bifurcated to provide laterally offset fingers 18 and 20. These fingers 18 and 20 embrace the respective webs 22 of circumferentially arranged brake shoes 24 to laterally position the latter with respect to spider 10.

Fastened to the ends of the flanges 14 by means of bolts 26 or the like are anchor blocks 28 provided with diverging guide projections 30. Two of the four anchor blocks 28, at diametrically opposite points, in the brake assembly, receive movable adjusting screws 32 which carry serrated heads 34. Spring detent members 36 are fastened to the sides of the respective anchor blocks to yieldably engage and retain the serrated heads 34 in adjusted position.

Web ends 38 of the brake shoes 24 engage the corresponding adjusting screw heads 34, while the other web ends 40 engage corresponding anchor blocks 28. Thus by rotating the adjusting screws 32, the shoes 24 may be shifted into concentric engagement with the rotatable drum 41, and then backed off a desired distance to set the running clearance between the brake shoes and the drum.

The shoes 24 have identically formed rims 42 which are symmetric about their transverse center lines. The ends of these rims 42, as viewed in Figure 1, are formed with slight inwardly bent portions 44 which terminate in tangential, straight end portions 46, the shoes being arranged on the spider 10 so that the adjacent rim ends 46 are juxtaposed as illustrated.

Referring now to Figure 2, it is seen that the rim ends 46 are formed with centrally disposed, longitudinal notches 48 which loosely embrace respective guide projections 30 on anchor blocks 28. These notches 48 in conjunction with the ears 16 on spider 10 serve to positively laterally position the brake shoes with respect to spider 10. It should be noted by reference to Figure 2 that the notches 48 are inclined slightly out of parallelism with the respective anchor blocks 28 for a purpose which will become apparent hereafter.

The contours of the end edges of rim ends 46 extend laterally outwardly from the notches 48 for a short distance designated by reference numeral 50, and then converge toward the adjacent rim ends to provide wedge surfaces 52. Thus it is seen in Figure 2 that two pairs of complementary inclined wedge surfaces are formed by each set of facing ends of the shoe rims.

Secured in any suitable manner, such as by the bolts 54, on anchor flanges 14 between corresponding anchor blocks 28 are two wheel cylinders 56 which are arranged with their axes substantially normal to the plane of spider 10. These cylinders 56 are provided with oppositely acting pistons 58 and 60 urged apart by means of compression spring 62. The outer ends of these pistons 58 are recessed to receive the ends of respective thrust links 64, the outer ends of these links 64 being enlarged and each provided with a groove 65. A pair of oppositely opening transverse notches 66 are formed in these enlarged ends to receive respective spindles 68 of abutting rollers 70 fitted in the respective grooves 65. A careful examination of the drawings will disclose that there is a slight clearance between each spindle 68 and the bottom of its notch 66 because of the engagement of the corresponding rollers 70 with each other. The purpose of this clearance will become apparent as the description proceeds. A concentric groove 72 is provided in each roller 70, and has a width sufficient to straddle the thickness of the respective rim end 46.

A suitable conduit 74 communicates with the interior of one wheel cylinder 56, and a branch tube 76 communicates with the interiors of both wheel cylinders 56.

Four return springs 78 are connected between the shoes in such a manner as to urge them into engagement with their respective anchors, and as illustrated are fastened between additional strengthening webs 79 which are fixed on opposite sides of webs 22.

The operation of this brake is as follows: By injecting a fluid pressure into wheel cylinders 56 between the pistons 58 and 60, these pistons are forced outwardly to impart corresponding motion to the rollers 70 which coact to exert a wedging action upon complementary wedge surfaces 52. This action spreads the adjacent rim ends apart to apply the brake shoes to the drum. Since the links 64 are capable of limited wobbling movement, the shoes may shift circumferentially with the drum to accommodate forward and reverse braking without impairing the effectiveness of the wedge action. In release, the fluid pressure in conduit 74 is relieved and the return springs 78 urge the adjacent shoe ends together forcing roller members 70 inwardly to retracted position.

Figure 4:
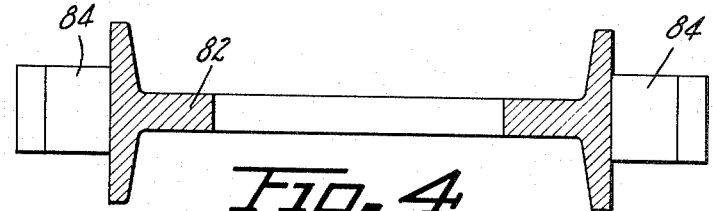
Figure 4 is an axial sectional view of a forged support member which may be used in place of the stamped support member of Figures 1–3.
Figure 7:
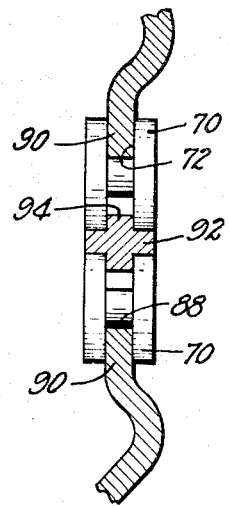
Figure 7 is a sectional view taken substantially on section line 7—7 of Figure 6.

The spider 10 of Figure 1 may be replaced by a forging, such as that illustrated in Figure 4 designated by reference numeral 82. The only major difference in design between the spiders 82 and 10 is that the anchors 84 are formed integral with spider 82 whereas the separate anchor members 28 are fastened by some convenient means such as bolts to the flanges 14.

The embodiment of Figure 1 may be modified as illustrated in Figure 5 so that only a single wheel cylinder 56 is provided in association with the adjacent expansible ends of the shoes, the other adjacent ends of the shoes being in contact with a fixed anchor. An adjusting screw 86 is added to the anchor block 28 which in Figure 1 does not carry an adjusting screw. This type of brake construction is commonly referred to as a non-servo brake since only one shoe is capable of self energizaiton in each direction of drum rotation.

In Figure 6 is illustrated another modification of the srtucture disclosed in Figure 1 in which the principal difference resides in moving the roller members 70 from the link members 64 to notches 88 in the rim ends 90. Instead of the link members 64 of Figure 2, wedges 92 are used which are provided with ribs 94 straddled by the sides of the grooves 72 of rollers 70. Thus it is seen that as the pistons 58 and 60 are forced outwardly, the wedges 92 act through the intermediary of rollers 70 to spread the rim ends 90 apart.

Among the foregoing stated advantages was the one that the present invention enabled the shoes to maintain uniform frictional engagement with the drum even though it bell-mouthed. This feature is readily understood by observing in Figure 2 that if the drum mouth 96 should widen, the brake shoes will tilt or cock by means of the inclined notches 48 to maintain engagement with the braking surface of the drum and the pistons 58 will follow up. Since the fluid pressures in cylinders 56 act equally on the pistons 58 and 60, the pressures over the areas of contact between the brake shoes and the drum will be substantially uniform.

Because of the mechanical advantage gained through the use of the wedge surfaces 52, a smaller wheel cylinder 56 may be used to produce a given braking effort than that used in conventional designs incorporating tangentially aligned wheel cylinders. Since there are a greater number of smaller wheel cylinders manufactured in mass production, the smaller wheel cylinders are more economical, and this economy is obviously reflected into the brake assembly of this invention.

Another advantage gained by use of the smaller wheel cylinders is that they may be incorporated into relatively small radial spaces. This is important in the respect, among others, that the wheel cylinder may be spaced from the drum a sufficient distance to prevent volatilization of the fluid in the cylinders by the heat radiated from the drum after a brake application.

Although several embodiments of the invention have been illustrated and described, various changes in the form and relative arrangements of the parts may be made to suit requirements.

I claim:

1. A brake assembly comprising a support member having a pair of diametrically spaced anchor flanges lying in parallel planes normal to the plane of said support member, said support member also having a pair of shoe guiding projections, radially outwardly extending anchor members carried on the ends of said flanges, an adjusting screw received in one of said anchor members on each flange and adapted to be engaged by a brake shoe, a pair of double acting wheel cylinders carried by said flanges intermediate the respective anchor members, the axes of said cylinders being normal to the plane of said support member, a plurality of floating thrust members operatively associated with said cylinders, each thrust member carrying a pair of coacting roller members on the outer ends thereof, a pair of shiftable brake shoes arranged on opposite sides of said support member, each having a rim and three laterally spaced strengthening webs, the ends of the center webs slidably engaging corresponding anchor members, facing ends of said rims being allochirally formed to provide therebetween four pairs of wedge surfaces, lateral-guide notches formed in the web ends engageable with corresponding anchor members, and return springs connected between said shoes adapted to yieldably urge said shoes against the respective anchor members, each pair of roller members engaging a corresponding pair of wedge surfaces whereby outward movement of said thrust members will cause adjacent ends of said shoes to be spread apart.

2. A brake assembly comprising a support member having a pair of shoe guiding projections, two pairs of spaced anchor members carried by said support member on diametrically opposite sides thereof, brake shoe adjusting means associated with said anchor members, a pair of wheel cylinders carried by said support member intermediate respective pairs of said anchor members, the axes of said wheel cylinders being normal to the plane of said support member, a plurality of floating thrust members operatively associated with said cylinders, each thrust member carrying a pair of coacting roller members on the outer ends thereof, a pair of shiftable brake shoes arranged on opposite sides of said support member, each having a rim and at least one strengthening web, the ends of the web operatively engaging corresponding anchor members, each pair of adjacent facing ends of said rims being allochirally formed to provide therebetween two pairs of wedge surfaces, guide notches also formed in the rim ends embracing corresponding anchor members, and return springs for said shoes adapted to yieldably urge said shoes against the respective anchor members, each pair of roller members engaging a corresponding pair of wedge surfaces whereby outward movement of said thrust members will cause adjacent ends of said shoes to be spread apart.

3. A brake assembly comprising a support member having a pair of diametrically spaced anchor flanges lying in parallel planes normal to the plane of said support member, radially outwardly extending anchor members carried on the ends of said flanges, an adjusting screw received in one of said anchor members on each flange and adapted to be engaged by a brake shoe, a pair of double acting wheel cylinders carried by said flanges intermediate the respective pairs of said anchor members with the axes of said cylinders being normal to the plane of said support member, a plurality of floating wedge shaped thrust members operatively associated with the ends of said cylinders, a pair of shiftable brake shoes circumferentially arranged on diametrically opposite sides of said support member, each of said shoes having its ends in operative engagement with corresponding anchor members, a pair of laterally spaced rollers carried in each end of the rim of each brake shoe, the rollers in the facing rim ends being juxtaposed to receive therebetween corresponding thrust members whereby outward movement of said thrust members will spread the shoe ends apart, each end of the shoe rims being further provided with a guide notch for embracing a respective anchor member, and shoe return springs for holding said shoes in retracted position.

4. A brake assembly comprising a support member, anchor members carried by said support member on diametrically opposite sides thereof, brake shoe adjusting means associated with said anchor members, a pair of wheel cylinders carried by said support member adjacent corresponding anchor members, the axes of said wheel cylinders being normal to the plane of said support member, a plurality of floating wedge shaped thrust members operatively associated with said cylinders, a pair of shiftable brake shoes arranged on diametrically opposite sides of said support member, each of said shoes having its ends in operative engagement with corresponding anchor members, a pair of laterally spaced rollers carried in each end of the rim of each brake shoe, the rollers in the facing rim ends being juxtaposed to receive therebetween corresponding thrust members whereby outward movements of said thrust members will spread the shoe ends apart, each end of the shoe rims being further provided with a guide notch for embracing a respective anchor member, and shoe return springs for holding said shoes in retracted position.

5. A brake assembly comprising a support member, two pairs of spaced anchor members carried by said support member on diametrically opposite sides thereof, brake shoe adjusting means associated with said anchor members, a wheel cylinder carried by said support member intermediate one pair of said anchor members with the axis thereof normal to the plane of said support member, two floating wedge-shaped thrust members operatively associated with said cylinder, a pair of shiftable brake shoes arranged on diametrically opposite sides of said support member, each of said shoes having its ends in operative engagement with corresponding anchor members, a pair of laterally spaced rollers carried in the end of the rim of each brake shoe adjacent the wheel cylinder, the rollers in the facing rim ends being juxtaposed to receive therebetween corresponding thrust members whereby actuating movement of said thrust members will spread the shoe ends apart, each end of the shoe rims being further provided with a guide notch for embracing a respective anchor member, and shoe return springs for holding said shoes in retracted position.

6. A brake assembly comprising a support member having two pairs of spaced radially outwardly extending anchor members on diametrically opposite sides thereof, adjusting means associated with one of each pair of anchor members, a pair of double acting wheel cylinders carried by said support member between respective pairs of said anchor members with the axes of said cylinders being normal to the plane of said support member, shoe spreading devices carried in the ends of said cylinders, a pair of shiftable brake shoes arranged on diametrically opposite sides of said support member, each of said shoes having its ends in sliding engagement with corresponding anchor members, each end of each shoe rim having a guide notch embracing a respective anchor member and a portion acted upon by a spreading device, friction reducing rollers interposed between each rim portion and the respective spreading device whereby actuating movement of said spreading device will force the shoe ends apart, and shoe return spring means for retracting each shoe to released position.

7. A brake assembly comprising a support member having two pairs of spaced radially outwardly extending anchor members on diametrically opposite sides thereof, adjusting means associated with one of each pair of anchor members, a pair of double acting wheel cylinders carried by said support member between said respective pairs of anchor members with the axes of said cylinders being normal to the plane of said support member, shoe spreading devices carried in the ends of said cylinders, a pair of shiftable brake shoes arranged on opposite sides of said support member, each of said shoes having its ends in sliding engagement with corresponding anchor members, each end of each shoe rim having a guide notch embracing a respective anchor member and a cam portion acted upon by a spreading device, friction reducing means interposed between each portion and the respective spreading device whereby actuating movement of said spreading device will force the shoe ends apart, and shoe return spring means for retracting each shoe to released position.

8. A brake assembly comprising a support member having anchor members on diametrically opposite sides thereof, a pair of wheel cylinders carried by said support member adjacent said anchor members, the axes of said cylinders being transverse to the plane of said support member, spreading devices carried in the ends of said cylinders, a pair of brake shoes adapted to normally engage said anchor members, each end of each shoe being formed with a guide means cooperable with a corresponding anchor member to laterally position the shoe, each shoe end having laterally extending cam portions adapted to be acted upon by a spreading device, friction reducing means associated with the shoe end portions whereby actuating movement of said spreading devices will urge said shoe ends apart, and means for yieldably urging said shoes to released position.

9. A brake assembly comprising a support member having anchor means on one side thereof, a wheel cylinder carried by said support member on the other side thereof, the axis of said cylinder being transverse to the plane of said support member, a pair of brake shoes having one set of adjacent ends disposed on either side of said cylinder and the other set of ends engaging said anchor means, said first mentioned adjacent ends being provided with laterally extending cam portions, means associated with said cylinder adapted to act on said portions to spread the shoe ends apart, and means for returning said shoes to released position.

10. A brake assembly comprising a support member having anchor means thereon, two arcuate rim-like brake shoes carried by said support member and arranged to anchor on said anchor means, at least one wheel cylinder directly carried by said support member and disposed between adjacent ends of said brake shoes, the axis of said cylinder being transverse to the plane of said support member, and means operatively connected to said wheel cylinder actuable to spread said adjacent ends of said shoes apart while permitting circumferential shifting of said adjacent shoe ends.

References Cited in the file of this patent

UNITED STATES PATENTS

| | | |
|---|---|---|
| 2,042,445 | Eksergian | May 26, 1936 |
| 2,064,575 | Taylor | Dec. 15, 1936 |
| 2,162,775 | Dick | June 20, 1939 |
| 2,496,562 | Schnell | Feb. 7, 1950 |
| 2,527,126 | Goepfrich et al. | Oct. 24, 1950 |